3,503,963
N,N'-DI-[PYRMIDYL-(4)-AMINOALKYL]-
DIAZACYCLOALKANES
Ernst Schweizer, Basel, Switzerland, assignor to Ciba Corporation, New York, N.Y., a corporation of Delaware
No Drawing. Continuation-in-part of application Ser. No. 577,600, Sept. 7, 1966. This application Nov. 30, 1966, Ser. No. 597,870
Claims priority, application Switzerland, Oct. 22, 1965, 14,630/65; Aug. 5, 1966, 11,330/66
Int. Cl. C07d 51/70
U.S. Cl. 260—239.65                                         9 Claims

ABSTRACT OF THE DISCLOSURE

N,N' - di - [pyrimidyl - (4)-aminoalkyl]-diazacycloalkanes in which the alklene radicals separate the nitrogen atoms bound to them by at least 2 carbon atoms in each case, and their N-oxides. The compounds are useful as antibacterial, tumor-inhibiting and anti-inflammatory agents.

---

This is a continuation-in-part application of our copending application Ser. No. 577,600, filed Sept. 7, 1966 now abandoned.

The present invention relates to new pyrimidines and their salts. Especially it concerns N,N'-di-[pyrimidyl-(4)-aminoalkyl]-diazacycloalkanes in which the alkylene radicals separate the nitrogen atoms bound to them by at least 2 carbon atoms in each case, and their N-oxides.

The amino groups in the new compounds may be further substituted. Thus, the amino groups may also be tertiary and may be substituted for instance by lower alkyls such as methyl or ethyl or linear or branched propyl, butyl or pentyl residues linked in any desired position; or aralkyl radicals such as phenyl-lower alkyls, for example benzyl or phenylethyl radicals.

Furthermore, the pyrimidyl residues may likewise be substituted, for example in the 2-position by halogen; by lower aliphatic hydrocarbon residues, especially lower alkenyl or preferably lower alkyl radicals; by lower aliphatic hydrocarbon residues containing an etherified hydroxyl group, for example of the kind mentioned above, such as lower alkoxy-lower alkyl or lower alkenyloxy-lower groups; by hydroxyl groups substituted by lower aliphatic hydrocarbon residues, for example of the kind mentioned above, being for example lower alkenyloxy or preferably lower alkoxy or lower alkoxy-lower alkoxy groups; or by corresponding residues in which oxygen atoms are replaced by sulphur atoms; or by free hydroxyl or mercapto groups or by amino groups. The lower alkyl radicals have also in the ether residues primarily the meaning given them above and are in the first place methyl, ethyl or propyl radicals. As lower alkenyl residues, also in the ether residues, there may be mentioned above all allyl radicals or methallyl or crotonyl radicals.

The lower alkoxy radicals in the lower alkoxy-lower alkyl residues are, for example, those mentioned above. The alkylene radicals which connect the oxygen atom with the pyrimidine nucleus are preferably alkylenes containing 1 to 5, especially 1 to 3, carbon atoms, being for example methylene residues, or ethylene, propylene, butylene or pentylene residues bound in any desired position. Lower alkoxy-lower alkyl radicals are especially residues of the formula $RO-(CH_2)_n-$ where R represents an alkyl radical containing 1 to 3 carbon atoms and $n=1$, 2 or 3.

The alkoxy groups present in the lower alkoxy-lower alkoxy residues are, for example, those mentioned above.

The alkylene radical connecting these alkoxy groups with the oxygen atom on the pyrimidine nucleus contains between the alkoxy group and the oxygen atom mentioned at least two carbon atoms and contains preferably 2 to 5 carbon atoms; more especially it is a 1,2-ethylene group or a 1,2- or 2,3- or 1,3-propylene group, or linear or branched butylene or pentylene group bound in any desired position which separates the vicinal oxygen atoms by at least two carbon atoms. In these residues the oxygen atoms may be replaced by sulfur.

Halogen atoms are more especially bromine, and above all chlorine.

Amino groups as 2-substituents of the pyrimidine ring may be, for example, primary, secondary or tertiary. Suitable substituents are, for example: Lower hydrocarbon residues of aliphatic character, whose carbon chain may be interrupted by hetero atoms such as oxygen, sulfur or nitrogen and/or which may be substituted by free hydroxyl or amino groups. Lower hydrocarbon residues of aliphatic character are above all alkyl, alkenyl, cycloalkyl or cycloalkenyl radicals, cycloakyl-alkyl or -alkenyl radicals, cycloalkenyl-alkyl or -alkenyl radicals containing up to 8 carbon atoms. Residues of this kind that are interrupted by hetero atoms are above all oxaalkyl, azaalkyl, oxaalkylene, azaalkylene or oxacycloalkyl-alkyl radicals. Lower hydrocarbon residues interrupted by hetero atoms include above all also aminoalkyl radicals in which the amino group is substituted as indicated above and described below. There may be specially mentioned methyl, ethyl, allyl, propyl, isopropyl residues; linear or branched butyl, pentyl, hexyl or heptyl residues bound in any desired position; 3-oxabutyl, 3-oxapentyl, 3-oxaheptyl, 2-hydroxyethyl, 3-hydroxypropyl, butylene-(1,4), pentylene-(1,5), hexylene-(1,5), hexylene-(1,6), hexylene-(2,5), heptylene-(1,7), heptylene-(2,7), heptylene-(2,6), 3-oxa-pentylene-(1,5), 3-aza-pentylene-(1,5), 3-lower alkyl-3-aza-pentylene-(1,5) such as 3-methyl-3-aza-pentylene-(1,5), 3-(hydroxy-lower alkyl)-3-aza-pentylene-(1,5) such as 3-hydroxyethyl-3-aza-pentylene-(1,5), 3-oxa-hexylene-(1,6) or 3-aza-hexylene-(1,6), cyclopentyl or cyclohexyl residues, or cyclopentyl- or cyclohexyl-methyl or -ethyl residues.

The amino group is preferably secondary, being especially a lower alkyl-amino group, for example, a methylamino, ethylamino or above all a propylamino, butylamino or pentylamino group in which the alkyl radicals are preferably not of primary nature, for example, an isopropylamino or secondary butylamino group. Of special advantage are, however, tertiary amino groups, especially di-lower alkyl-amino groups such as dimethylamino, diethylamino, N-methyl-N-ethylamino, dipropylamino, diisopropylamino, dibutylamino, di-secondary butylamino or di-amylamino groups, or pyrrolidino, piperidino, piperazino, N-lower alkyl- or N-hydroxy-lower alkyl-piperazino or morpholino groups. The amino group on the pyrimidine nucleus in the 2-position may also be with advantage a loweralkylamino group substituted by one of the afore-mentioned secondary or tertiary amino groups, such as mono- or di-lower alkylamino, pyrrolidino, piperidino, piperazino, N-lower alkylpiperazino or N-hydroxy-lower alkyl-piperazino or morpholino-lower alkylamino group.

The pyrimidine nucleus may also be substituted in position 5 and/or 6, above all by one of the substituents indicated above for position 2. Lower alkyl radicals in positions 5 and 6 may together form an alkylene radical, for example, a butylene-(1,4) radical.

The diazacycloalkane ring, in which the alkylene radicals separate the nitrogen atoms by at least 2 carbon atoms, thus contains at least 6 cyclic members, and preferably at most 8 cyclic members. The alkylene radicals are above all linear or branched alkylene radicals each containing at most 6 carbon atoms, for example butylene-(2,4), butylene-(1,4), pentylene-(1,5), pentylene-(2,5), hexylene-(2,6) or hexylene-(3,6) or above all an ethylene-(1,2) residue and in the first place propylene-(1,3) or propylene-(2,3) or propylene-(1,2). In the first place the diazacycloalkane ring is a piperazine ring which may be substituted by lower alkyl radicals, above all by methyl groups, and is especially the piperazine ring.

The alkylene radicals that separate the diazacycloalkane ring from the pyrimidyl-4-amino groups by at least 2 carbon atoms contain predominantly 2 to 6 carbon atoms and are, for example, butylene-(2,4), butylene-(1,4), pentylene-(1,5), pentylene-(2,5), hexylene-(1,6), or hexylene-(2,6), but preferably ethylene-(1,2), and primarily propylene-(1,3), propylene-(2,3) or propylene-(1,2).

The two pyrimidylaminoalkyl residues in the new compounds may be identical or different.

The new compounds possess valuable pharmacological properties. More especially, they act against bacteria, such as tubercle bacilli, above all against protozoa, especially plasmodia, for example, in the mouse, and against piroplasms such as babesia, babesiellae and theileriae. They also act against plasmodia that resist known antimalarial medicaments. The new compounds may therefore be used pharmacologically on animals or as medicaments, for example for treating malaria, babesiosis, theileriosis, anaplasmosis and other infections. They may also be used as animal feedstuffs or as additives to animal feedstuffs. Furthermore, they have a tumour inhibitory activity and, for example in the rat, the new compounds display an anti-inflammatory action. They may thus be used pharmacologically on animals or medicinally as antiphlogistics. Moreover, they are valuable intermediates.

Particularly potent, above all in their action against plasmodia and babesia and as anti-inflammatory substances, are those compounds in which at least one of the pyrimidine rings contains in position 2 and/or 6 a free amino group or, for example, one substituted as indicated above, and in the first place compounds of the formula I 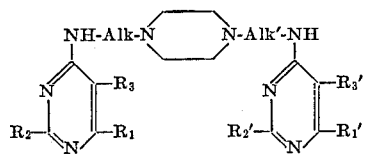

where at least one of the residues $R_1$, $R_2$ and $R_1'$, $R_2'$ is a free amino group or a substituted amino group, above all one of those specially mentioned above, and particularly a mono- or di-lower alkylamino, pyrrolidino, piperidino, morpholino, piperazino or N-lower alkyl-piperazino or hydroxy-lower alkyl-piperazino group, for example as indicated above, and especially a diethylamino group or preferably a dimethylamino group, whereas the others of these residues may represent hydrogen or preferably a loweralkyl- or lower alkoxy-lower alkyl radical, above all one of those specially mentioned above, especially propyl, ethyl, methoxyethyl, ethoxyethyl, or especially methyl; the residues $R_3$ and $R_3'$ represents above al hydrogen or in the second place lower alkyl or lower alkoxy-lower alkyl residues, especially those of the kind indicated above for $R_1$ and $R_2$, and the residues Alk and Alk' are lower alkylene-(1,>1) residues containing 2 to 6 carbon atoms, above all 2 to 4 carbon atoms, and in the first place propylene-(1,>1) radicals (primarily propylene-(1,3) radicals and especially butylene-(1,4) radicals.

Special mention deserve compounds of the formula

II 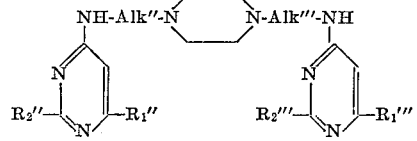

where $R_1''$ and $R_1'''$ represent free amino groups of pyrrolidino, piperidino, morpholino, piperazino or N-lower alkyl-piperazino or hydroxy-lower alkyl-piperazino groups, and above all mono- or di-lower alkylamino groups, for example as indicated above, and especially diethylamino or preferably dimethylamino groups; $R_2''$ and $R_2'''$ represent hydrogen or lower alkyl, such as propyl, ethyl or especially methyl, and Alk'' and Olk''' are propylene-(1,2), propylene-(2,3), ethylene-(1,2) or primarily propylene-(1,3) and butylene-(1,4).

Particularly valuable anti-malarial medicaments and antiphlogistics are N,N'-di-[γ-(6-methylamino-2-methylpyrimidyl-4-amino)-propyl]-piperazine, further N,N'-di-[γ-(6-amino - 2 - methyl-pyrimidyl - 4 - amino)-propyl]-piperazine and in the first place N,N'-di-[γ-(6-dimethylamino - 2-methyl-pyrimidyl-4-amino)-propyl]-piperazine of the Formula III III 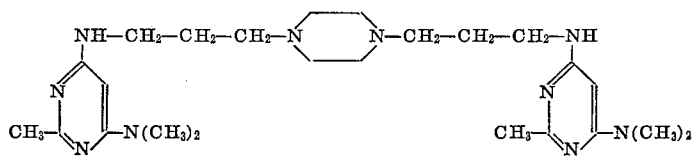

which for example develops a pronounced antimalerial action in the mouse on subcutaneous administration in doses of 20–40 mg. per kg. bodyweight and which displays in the rat in the kaolin and in the pleuritis test in doses of 30–50 mg./kg. subcutaneously and in the foreign body granuloma in doses of 10–30 mg./kg. subcutaneously a distinct anti-inflammatory effect, and, on account of its anti-malarial effect N,N'-di-[γ-(6-dimethylamino-2-methyl-pyrimidyl-4-amino)-butyl]-piperazine of the formula

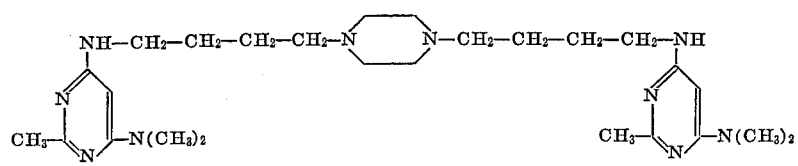

Likewise specially valuable, though less so than the above types of compounds I and II, are those of these formulae in which the residues which in these formulae represent amino groups, represent hydrogen or a lower alkyl or lower alkoxy-lower alkyl group, for example as indicated above.

The new compounds are obtained in the usual manner; advantageously, an N,N'-di-(amino-alkyl)-diazacycloalkane in which the alkylene chains separate their substituents by at least 2 carbon atoms in each case, is reacted with 2 molecules of a 4-halogeno-pyrimidine. A halogen atom is primarily a chlorine or bromine atom.

Furthermore, the new compounds are also obtained when in a derivative of an N,N'-di-[pyrimidyl-(4)-aminoalkyl]-diazacycloalkane, in which the alkylene chains separate the nitrogen atoms in each case by at least 2 carbon atoms, and which differs from this diazacycloalkane by the fact that in it at least one of the alkylene chains contains a residue which can be selectively exchanged for hydrogen, the residues replaceable by hydrogen are so replaced. Such residues are above all oxo groups attached to a carbon atom linked with nitrogen and which can be replaced by hydrogen by the usual amide reducing agents, above all lithium-aluminium hydride and similar amide reducing agents, without a substantial reduction taking place in the pyrimidine rings. An advantageously used starting material is a suitable N,N'-di-[ω-(pyrimidyl-(4)-amino)-ω- or -α-oxoalkyl]-diazacycloalkane.

Substituents in resulting compounds can be converted in the usual manner within the framework of the final process products as defined. More especially halogen atoms, in positions 2 and/or 6 of the pyrimidine rings, may be exchanged for amino groups, for example by treatment with ammonia or a primary or secondary amine.

For the manufacture of 2-amino-pyrimidyl-(4) compounds, especially of compounds of the Formula I where the residues $R_2$ and $R_2'$ are amino groups, it is most advantageous to start from a 2,4-dihalogeno-pyrimide, especially from a compound of the formula

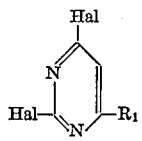

and from N,N'-di-aminoalkyl-diazacycloalkanes, especially those of the formula

where Hal are halogen atoms and $R_1$ and Alk have the above meanings, and after having reacted the halogen atom in position 4 the halogen atom in position 2 is exchanged for an amino group $R_2$ or $R_2'$. For the manufacture of 6-amino-pyrimidyl-(4) compounds, especially the compounds of the Formula I in which $R_1$ and $R_1'$ are amino groups, it is advantageous to start directly from the 6-amino-4-halogeno-pyrimidine compounds.

The afore-mentioned reactions are carried out in the usual manner, in the presence or absence of diluents and/or condensing agents and/or catalysts, at room temperature or with cooling or heating, if required under superatmospheric pressure and/or in an inert gas.

Depending on the reaction conditions used the new compounds are obtained in the free form or in the form of their salts. The bases form therapeutically acceptable salts on treatment with acids, for example therapeutically acceptable acids such as hydrohalic acids, sulphuric or phosphoric acids, nitric or perchloric acid; aliphatic, alicyclic, aromatic or heterocyclic carboxylic or sulphonic acids, such as formic, acetic, propionic, oxalic, succinic, glycollic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicyclic, embonic, or para-aminosalicyclic acid; methanesulphonic, ethanesulphonic, hydroxyethanesulphonic, ethylenesulphonic acid; toluenesulphonic, naphthalene sulphonic acids or sulphanilic acid; methionine, tryptophan, lysine or arginine. Resulting salts can be converted into the free compounds.

The salts may also be used for purifying the free compounds. In view of the close relationship between the new compounds in the free form and in the form of their salts, what has been said above with reference to the free compounds concerns also the corresponding salts wherever this is possible and useful.

The invention includes also any variant of the process in which an intermediate obtained at any stage of the process is used as starting material and any remaining step/steps is/are carried out, or a starting material is formed under the reaction conditions or is used in the form of a salt thereof, as well as the new starting materials. It is advantageous to use starting materials and reaction conditions that give rise to the final products specially mentioned above.

The resulting diazacycloalkane compounds can be converted into their N-oxides in the usual manner, for example by means of hydrogen peroxide or organic peracids, such as perbenzoic or peracetic acid.

A resulting racemic compound can be split into its optical antipodes in the usual manner.

The starting materials are known or are prepared by analogous methods. New starting materials are likewise included in the present invention. Starting materials that differ from the final products by the presence of a residue exchangeable for hydrogen in at least one of the alkylene radicals, especially the oxo compounds, likewise have the actions described above for the final products and are included in the present invention; they are obtained by one of the known relevant methods referred to above, for example from corresponding starting materials containing an oxo group.

The new final products and their salts can be used as medicaments, for example in the form of pharmaceutical preparations containing the new compounds or their salts in conjunction or admixture with an organic or inorganic, solid or liquid pharmaceutical excipient suitable for enteral or parenteral administration. Suitable excipients are substances that do not react with the new compounds, for example water, lactose, starches, magnesium stearate, talcum, vegetable oils, benzyl alcohols, gums, polyalkyleneglycols, cholesterol or other known medicinal excipients. The pharmaceutical preparations may be, for example, tablets or dragees, or in liquid form solutions, suspensions or emulsions. They may be sterilized and/or may contain auxiliaries, such as preserving, stabilizing, wetting or emulsifying agents, salts for regulating the osmotic pressure or buffers. They may also contain other therapeutically useful substances.

The following examples illustrate the invention.

EXAMPLE 1

A mixture of 14.2 g. of 2,6-dimethyl-4-chloropyrimidine and 10 g. of N,N'-di-γ-aminopropyl-piperazine is heated for 2 hours at 180° C. The resulting product is dissolved in dilute acetic acid, and the solution is treated with active carbon and then rendered alkaline. The precipitated N,N' - di - [γ-(2,6-dimethyl-pyrimidyl-4-amino)-propyl]-piperazine of the formula

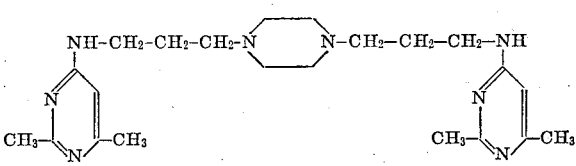

is suctioned off and recrystallized from aqueous methanol; it melts at 146 to 148° C.

EXAMPLE 2

A mixture of 17.1 g. of 2-methyl-6-dimethylamino-4-chloropyrimidine, 10 g. of N,N'-di-γ-aminopropyl-piperazine and 50 cc. of sulpholane is heated for 4 hours at 190° C., allowed to cool, poured into water, and the solution is rendered weakly alkaline. The precipitate is suctioned off and recrystallized from aqueous methanol. The resulting N,N'-di-[γ-(2-methyl-6-dimethylamino - pyrimidyl - 4 - amino)-propyl]-piperazine of the formula

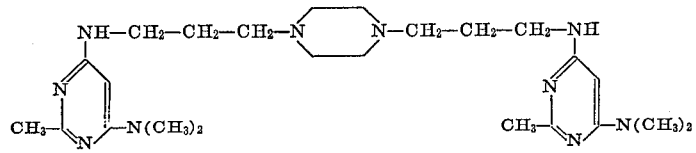

melts at 191 to 194° C.

EXAMPLE 3

15.7 grams of 2-methyl-6-methylamino-4-chloropyrimidine and 10 g. of N,N'-di-γ-aminopropyl-piperazine are mixed together with 75 g. of phenol and 250 mg. of ammonium chloride and the whole is stirred and heated for 4 hours at 180 to 190° C. The cooled batch is stirred into 1 litre of 2 N-sodium hydroxide solution, and the precipitate is suctioned off and recrystallized from dimethylformamide, to yield N,N'-di-[γ-(2-methyl-6-methylamino - pyrimidyl-4-amino)-propyl]-piperazine of the formula

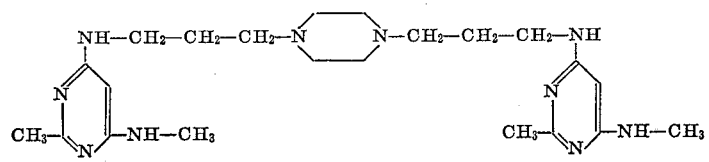

melting at 204 to 206° C.

EXAMPLE 4

A mixture of 14.3 g. of 2-methyl-6-amino-4-chloropyrimidine, 10 g. of N,N'-di-γ-aminopropyl-piperazine, 75 g. of phenol and 250 mg. of ammonium chloride is heated for 4 hours at 180 to 190° C., allowed to cool and then poured into 1 litre of 2 N-sodium hydroxide solution. The precipitate is suctioned off and recrystallized from methanol, to yield N,N'-di-[γ-(2-methyl-6-amino-pyrimidyl-4-amino)-propyl]-piperazine of the formula

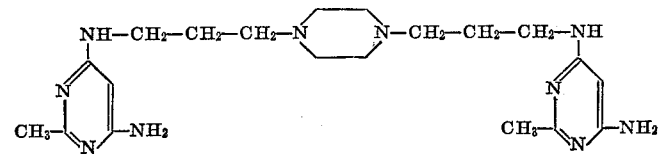

melting at 200 to 202° C.

EXAMPLE 5

18.8 g. of 2-methoxymethyl-6-methylamino-4-chloropyrimidine, 10 g. of N,N'-di-γ-aminopropyl-piperazine and 23.5 g. of phenol are heated for 4 hours at 190° C.; the mixture is then cooled to 100° C. and stirred into 500 ml. of 2 N sodium hydroxide solution. The precipitating N,N'-di-[γ-(2-methoxymethyl-6-methylamino - pyrimidyl-4-amino)-propyl]-piperazine of the formula

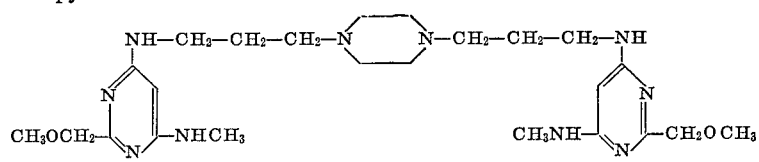

melts at 178–182° C.

EXAMPLE 6

A mixture of 16.3 g. of 2-dimethylamino-6-methyl-4-chloropyrimidine, 10 g. of N,N'-di-γ-amino-propyl-piperazine, 30 g. of phenol and 250 mg. of ammonium chloride is heated for 4 hours at 180° C. The isolation of the base is carried out as described in Example 4. The base is dissolved in ethanol. By the addition of ethanolic hydrochloric acid the tetrahydrochloride of N,N'-di-[γ-(2-dimethylamino-6-methylpyrimidyl - 4 - amino)-propyl] piperazine of the formula

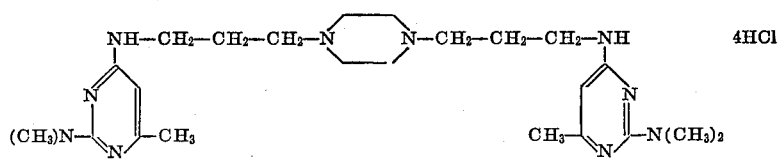

is obtained which, when recrystallized from ethanol, melts at >300° C.

EXAMPLE 7

20 g. of N,N'-di-γ-aminopropyl-piperazine and 28 ml. of triethylamine are dissolved in 60 ml. of methanol. A solution of 2-methyl-4,6-dichloropyrimidine is added dropwise at 60° C. The mixture is heated for 8 hours under reflux, the methanol distilled off and the residue treated with 2 N sodium hydroxide solution. N,N'-di-[γ-(2-methyl-6-chloropyrimidyl-4-amino) propyl]-piperazine of the formula

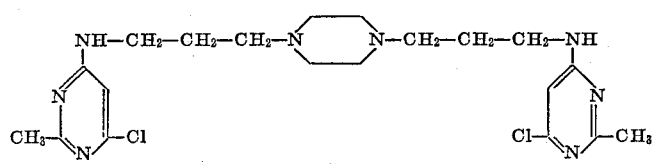

is filtered with suction and recrystallized from a mixture of methanol and water; it melts at 157–160° C.

EXAMPLE 8

5.6 g. of the substance described in Example 7 are heated at 190° C. with 50 ml. of morpholine for 4 hours. The residue is treated with 2 N sodium hydroxide solution and N,N''-di-[γ-(2-methyl - 6 - morpholino-pyrimidyl-4-amino)-propyl]-piperazine of the formula

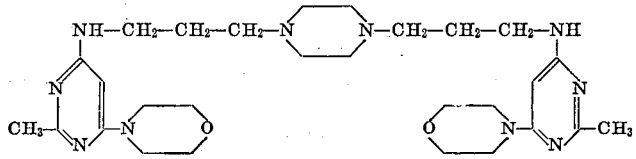

is filtered with suction and recrystallized from dimethylformamide; it melts at 178-180° C.

EXAMPLE 9

By an analogous reaction to that described in Example 8 with N-methyl-piperazine there is obtained N,N'-di-[γ-{2-methyl - 6 - methylpiperazino) - pyrimidyl-4-amino} propyl]-piperazine of the formula

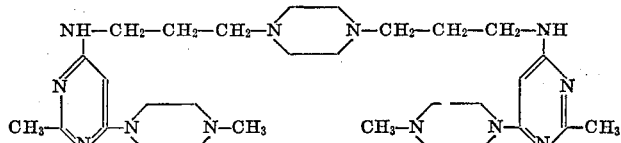

It is recrystallized from water and melts at 68-80° C.

EXAMPLE 10

By an analogous reaction to that described in Example 8 with piperidine there is obtained N,N'-di-[γ-(2-methyl-6-piperidino - pyrimidyl - 4 - amino)-propyl]-piperazine of the formula

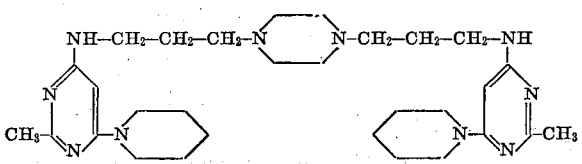

It melts at 154-156° C. after recrystallization from dimethylformamide.

EXAMPLE 11

By an analogous reacttion to that described in Example 8 with pyrrolidine there is obtained N,N'-di-[γ-(2-methyl-6-pyrrolidino-pyrimidyl - 4 - amino)-propyl]-piperazine of the formula

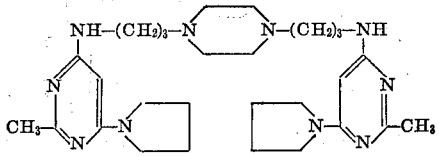

which melts at 145-147° C. after recrystallization from dimethylformamide .

EXAMPLE 12

43.6 g. of 2,4,5,6-tetrachloropyrimidine are dissolved in 300 ml. of ethanol and a solution of 20 g. of N,N'-di-γ-aminopropyl-piperazine in 100 ml. of ethanol is added dropwise at room temperature. After stirring for 2 hours the precipitated N,N'-di-[γ-(2,5,6-trichloropyrimidyl-4-amino)-propyl]-piperazine of the formula

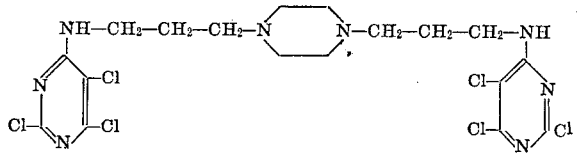

is filtered with suction and recrystallized from dimethylformamide; it melts at 280° C. with decomposition.

EXAMPLE 13

19.6 g. of the compound described in Example 12 are heated with 200 ml. of a saturated methanolic dimethylamine solution for 8 hours at 120° C. in an autoclave, the methanol is distilled off and the residue treated with water. The precipitating N,N'-do-[γ-{2,6-di-(dimethylamino) - 5 - chloropyrimidyl - 4 - amino}-propyl]-piperazine hexahydrochloride of the formula

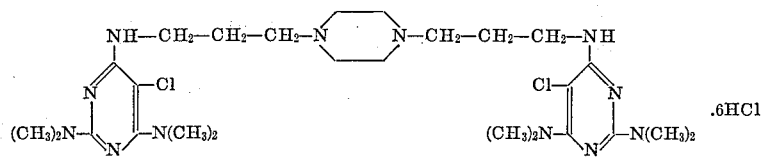

is filtered with suction and recrystallized from dimethylformamide; it melts at 253-255° C.

EXAMPLE 14

By an analogous reaction to that described in Example 13 with morpholine there is obtained N,N'-di-[γ-(2,6-dimoropholino - 5 - chloropyrimidyl - 4 - amino)-propyl]-piperazine of the formula

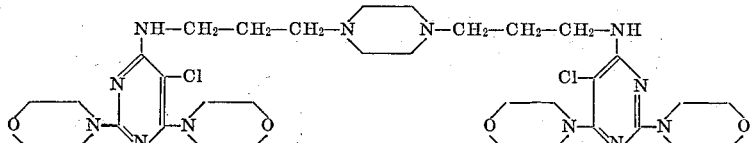

which is recrystallized from methanol; it melts at 207-210° C.

EXAMPLE 15

17.29 g. of N,N'-di-β-aminoethyl-piperazine and 28 ml. of triethylamine are dissolved in 60 ml. of methanol. A solution of 32.6 g. of 2-methyl-4,6-dichloropyrimidine in 80 ml. of methanol is added dropwise. After heating for 8 hours under reflux, the methanol is distilled off, the residue is dissolved in 200 ml. of ethanol, treated with active carbon, filtered off and the hot filtrate treated with hot water until it becomes turbid. On cooling, N,N'-di-[β-(2 - methyl - 6 - chloropyrimidyl - 4 - amino)-ethyl]-piperazine of the formula

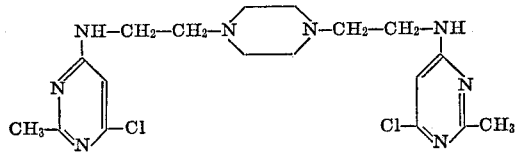

crystallizes out; it melts at 166–169° C.

EXAMPLE 16

7.9 g. of the substance described in Example 14 are heated with 40 ml. of N-methylpiperazine for 4 hours at 180° C. in an autoclave. The excess N-methylpiperazine is then distilled off, the residue dissolved in water. On addition of 2 N sodium hydroxide solution N,N'-di-[β-{2-methyl - 6-N-methylpiperazinopyrimidyl - 4-amino}-ethyl]-piperazine of the formula

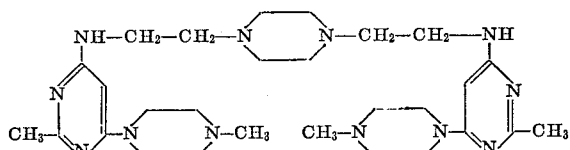

precipitates; it melts at 168–170° C.

EXAMPLE 17

By an analogous reaction to that described in Example 16 with morpholine there is obtained N,N'-di-[β-(2-methyl - 6 - morpholino-pyrimidyl - 4 - amino)-ethyl]-piperazine of the formula

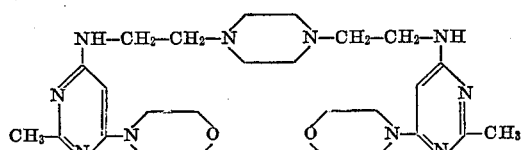

It is recrystallized from dimethylformamide and melts at 227–229° C.

EXAMPLE 18

A mixture of 28.4 g. of 2,6-dimethyl-4-chloropyrimidine, 17.2 g. of N,N'-di-β-aminoethyl-piperazine, 75 g. of phenol and 250 mg. of ammonium chloride is heated for 4 hours at 170° C. and then stirred into 1 litre of 2 N sodium hydroxide solution. N,N'-di-[β-(2,6-dimethyl-pyrimidyl-4-amino)-ethyl]-piperazine of the formula

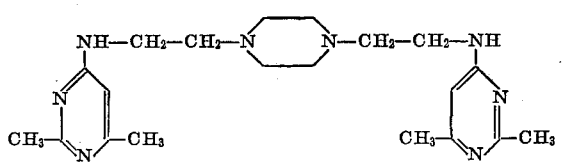

is filtered with suction and recrystallized from a mixture of methanol and water; it melts at 151–153° C.

EXAMPLE 19

31.4 g. of 2-methyl-6-methylamino-4-chloropyrimidine and 17.2 g. of N,N'-di-β-aminoethyl-piperazine are mixed together with 31.3 g. of phenol and 200 mg. of ammonium chloride and heated for 4 hours at 185° C. The cooled mixture is stirred into 400 ml. of 2 N sodium hydroxide solution. N,N'-di[β-(2-methyl - 6 - methyl-amino-pyrimidyl - 4 - amino)-ethyl]-piperazine of the formula

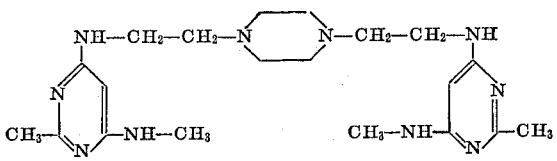

precipitates and is filtered with suction; it melts at 225–228° C.

EXAMPLE 20

A mixture of 34.3 g. of 2-methyl-6-dimethyl-amino-4-chloropyrimidine, 17.2 g. of N,N'-di-β-amino-ethyl-piperazine and 47 g. of phenol is heated for 4 hours at 190° C. The reaction mixture is worked up as described in Example 19. N,N'-di-[β-(2-methyl-6-dimethylamino-pyrimidyl-4-amino)-ethyl]-piperazine of the formula

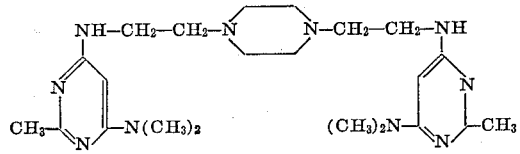

is recrystallized from a mixture of methanol and water and melts at 117–120° C.

EXAMPLE 21

A mixture of 14.2 of 2,6-dimethyl-4-chloropyrimidine, 11.4 g. of N,N'-di-δ-aminobutyl-piperazine, 37.5 g. of phenol and 200 mg. of ammonium chloride is heated for 4 hours at 170° C. and N,N'-di-[δ-(2,6-dimethyl-pyrimidyl-4-amino)-butyl]-piperazine of the formula

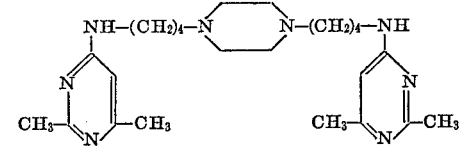

is isolated by treatment with 2 N sodium hydroxide solution. The dihydrochloride melts at 268–271° C.

EXAMPLE 22

By reacting 6.8 g. of 2-methyl-6-dimethylamino-4-chloropyrimidine, 4.6 g. of N,N'-di-δ-aminobutyl-piperazine and 11.7 g. of phenol in the way described in Example 21 there is obtained N,N'-di-[δ-(2-methyl-6-dimethylamino-pyrimidyl-4-amino)-butyl]-piperazine of the formula

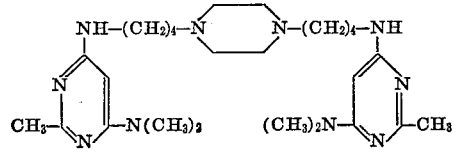

which after recrystallization from a mixture of methanol and water melts at 110–112° C.

EXAMPLE 23

N,N' - di - [δ - (2 - methyl - 6 - chloro - pyrimidyl - 4-amino)-butyl]-piperazine of the formula

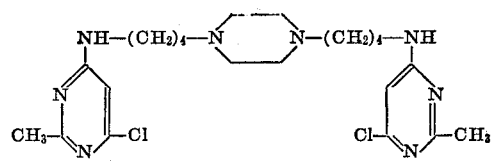

is obtained by reacting 32.6 g. of 2-methyl-4,6-dichloropyrimidine and 22.8 g. of N,N'-di-δ-aminobutyl-piperazine in 150 ml. of methanol in the presence of 28 ml. of triethylamine by heating under reflux for 8 hours. The methanol is distilled off and the compound recrystallized from a mixture of methanol and water; it melts at 145–148° C.

EXAMPLE 24

14.2 g. of 2,6-dimethyl-4-chloropyrimidine, 11.4 g. of N,N'-di-γ-aminopropyl-2,5-dimethylpiperazine, 35 g. of phenol and 200 mg. of ammonium chloride are heated for 4 hours at 190° C. N,N'-di-[γ-(2,6-dimethyl-pyrimidyl-4-amino)-propyl]-2,5-dimethylpiperazine of the formula

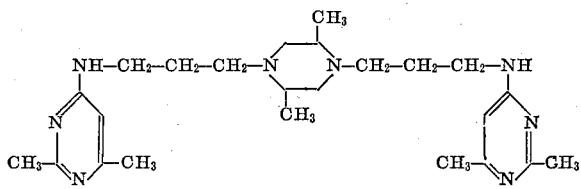

is isolated by treatment with 500 ml. of 2 N sodium hydroxide solution; the product melts at 183–185° C.

EXAMPLE 25

By reacting 15.7 g. of 2-methyl-6-methylamino-4-chloropyrimidine, 11.4 g. of N,N'-di-γ-amino-propyl-2,5-dimethylpiperazine, 35 g. of phenol and 200 mg. of ammonium chloride in the manner described in Example 24 there is obtained N,N'-di-[γ-(2-methyl-6-methylamino-pyrimidyl-4-amino)-propyl]-2,5-dimethylpiperazine of the formula

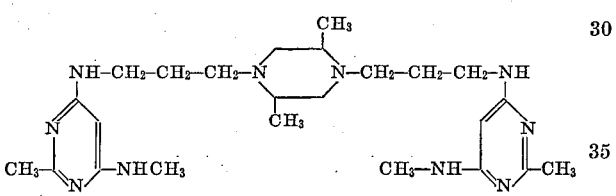

It is recrystallized from a mixture of methanol and water and melts at 170–175° C.

EXAMPLE 26

N,N' - di - [γ - (2 - methyl - 6 - dimethylamino - pyrimidyl-4-amino-propyl]-2,5-dimethylpiperazine of the formula

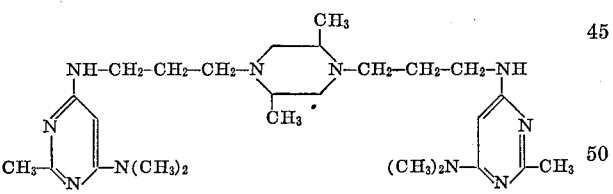

is obtained by an analogous reaction to that described in Example 24 by using 17.2 g. of 2-methyl-4-dimethylamino-6-chloropyrimidine, 11.4 g. of N,N'-di-γ-aminopropyl-2,5-dimethylpiperazine and 23.4 g. of phenol. The product melts at 136–139° C.

EXAMPLE 27

N,N' - di - [γ - (2 - methyl - 6 - chloro - pyrimidyl - 4-amino)-propyl]-2,5-dimethylpiperazine of the formula

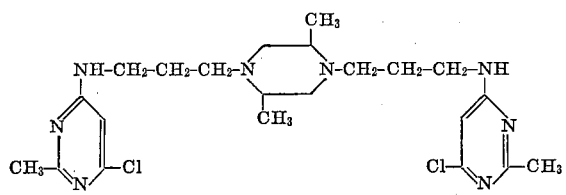

is formed when 16.3 g. of 2-methyl-4,6-dichloropyrimidine and 11.4 g. of N,N'-di-γ-aminopropyl-2,5-dimethylpiperazine are reacted in 100 ml. of methanol in the presence of 14 ml. of triethylamine. The compound is recrystallized from a mixture of methanol and water and melts at 170–172° C.

EXAMPLE 28

A mixture of 11.4 g. of 2-methyl-6-dimethyl-amino-4-chloropyrimidine, 8.7 g. of N,N'-di-γ-amino-β-dimethylpropyl-piperazine, 15.7 g. of phenol and 100 mg. of ammonium chloride is heated for 3 hours at 190° C.; after cooling, the reaction mixture is stirred into 250 ml. of 2 N sodium hydroxide solution, N,N'-di-[γ-(2-methyl-6-dimethylamino - pyrimidyl - 4 - amino) - β - dimethylpropyl]-piperazine of the formula

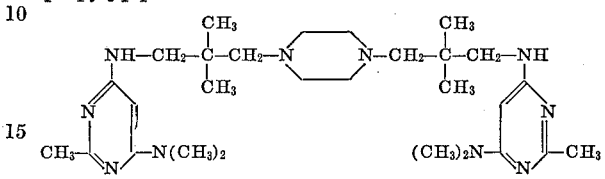

precipitating. After recrystallization from a mixture of methanol and water the product melts at 175–177° C.

EXAMPLE 29

Tablets containing 100 mg. of active substance are prepared, for example with the following ingredients:

| Ingredients: | Per tablet, mg. |
|---|---|
| N,N'-di-[γ-(2-methyl-6-dimethylamino - pyrimidyl-4-amino)-propyl]-piperazine | 100 |
| Lactose | 50 |
| Wheat starch | 50 |
| Colloidal silicic acid | 13 |
| Arrowroot | 24 |
| Talc | 12 |
| Magnesium stearate | 1 |
| | 250 |

Method

The N,N'-di-[γ-(2-methyl-6-dimethylamino-pyrimidyl-4-amino)-propyl]-piperazine is mixed with the lactose, a part of the wheat starch and with colloidal silicic acid and the mixture passed through a sieve. The remaining wheat starch is pasted with 5 times the quantity of water on a water-bath and the powdery mixture kneaded with this paste until a slightly plastic mass is formed. The plastic mass is passed through a sieve having a mesh of about 3 mm., dried and the dry granulate passed again through a sieve. Arrowroot, talc and magnesium stearate are then mixed in and the resulting mixture compressed into tablets weighing 250 mg.

What is claimed is:
1. A member selected from the group consisting of a compound of the formula

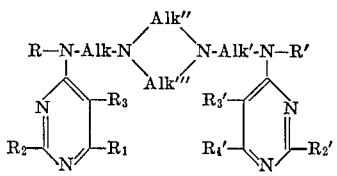

in which R and R' each is a member selected from the group consisting of hydrogen and lower alkyl, $R_1$, $R_2$, $R_3$ and $R_1'$, $R_2'$ and $R_3'$ are members selected from the group consisting of hydrogen, halogen, lower alkyl, lower alkenyl, lower alkoxy-lower alkyl, lower alkenyloxy-lower alkyl, lower alkoxy, lower alkenyloxy, lower alkoxy-lower alkoxy, hydroxy, free amino, and amino substituted by at least one member selected from the group consisting of lower alkyl, lower alkenyl, cyclo-lower alkyl, cyclo-lower alkenyl, cyclo-lower alkyl-lower alkyl, cyclo-lower alkyl-lower alkyl and cyclo-lower alkenyl, cyclo-lower alkenyl-lower alkyl and -lower alkenyl, each of said cyclo-lower alkyl and cyclo-lower alkenyl moieties having 5 to 6 carbon atoms, oxa-lower alkylene and aza-lower alkylene, and $R_1$ and $R_3$ and $R_1'$ and $R_3'$ taken together are lower alkylene, Alk, Alk', Alk" and Alk'"

each represents lower alkylene which separates the nitrogen atoms by at least two carbon atoms; their N-oxides and therapeutically acceptable acid addition salts thereof.

2. A compound as claimed in claim 1, said compound being a member selected from the group consisting of a compound of the formula

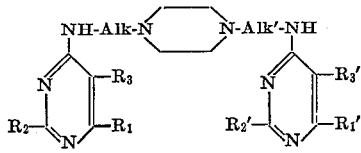

in which at least one of the radicals $R_1$ and $R_2$ and at least one of the raicals $R_1'$ and $R_2'$ each represents a member selected from the group consisting of free amino, mono- and di-lower alkylamino, pyrrolidino, piperidino, piperazino, N-lower alkyl piperazino and N-hydroxy-lower alkyl piperazino, whereas the others of these radicals are members selected from the group consisting of hydrogen, lower alkyl and lower alkoxy-lower alkyl, symbols $R_3$ and $R_3'$ represent members selected from the group consisting of hydrogen, lower alkyl and lower alkoxy-lower alkyl and the symbols "Alk" and "Alk'" represent alkylene-(1,>1) having 2 to 6 carbon atoms; and therapeutically acceptable acid addition salts thereof.

3. A compound as claimed in claim 2, in which at least one of the radicals $R_1$ and $R_2$ and at least one of the radicals $R_1'$ and $R_2'$ represent a member selected from the group consisting of mono- and di-lower alkylamino and the others of these radicals have the meaning given in claim 2.

4. A compound as claimed in claim 1, said compound being a member selected from the group consisting of a compound of the formula

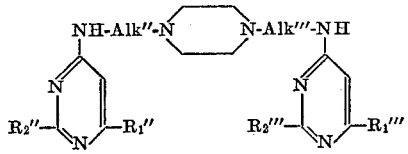

in which $R_1''$ and $R_1'''$ each represents a member selected from the group consisting of free amino, mono- and di-lower alkylamino, pyrrolidino, piperidino, morpholino, piperazino or N-lower alkyl and N-hydroxy lower alkyl-piperazino, $R_2''$ and $R_2'''$ each represents a member selected from the group consisting of hydrogen and lower alkyl, and Alk'' and Alk''' each represents a member selected from the group consisting of propylene-(1,2), propylene-(2,3), ethylene-(1,2) and propylene-(1,3), and therapeutically acceptable acid addition salts thereof.

5. A compound as claimed in claim 4, in which $R_1''$ and $R_1'''$ each represents a member selected from the group consisting of mono- and di-lower alkylamino and the other symbols have the meaning given in claim 4.

6. A compound as claimed in claim 1, said compound being a member selected from the group consisting of N,N' - di - [γ - (6 - methylamino - 2 - methyl - pyrimidyl-4-amino)-propyl]-piperazine, and therapeutically acceptable acid addition salts thereof.

7. A compound as claimed in claim 1, said compound being a member selected from the group consisting of N,N' - di - [γ - (6 - amino - 2 - methyl - pyrimidyl - 4 - amino)-propyl]-piperazine, and therapeutically acceptable acid addition salts thereof.

8. A compound as claimed in claim 1, said compound being a member selected from the group consisting of N,N' - di - [γ - (6 - dimethylamino - 2 - methyl - pyrimidyl - 4 - amino) - propyl] - piperazine, and therapeutically acceptable acid addition salts thereof.

9. A compound as claimed in claim 1, said compound being a member selected from the group consisting of N,N' - di - [δ - (6 - dimethylamino - 2 - methyl - pyrimidyl - 4 - amino)-butyl]-piperazine, and theapeutically acceptable acid addition salts thereof.

References Cited

UNITED STATES PATENTS 3,188,313   6/1965   Archer _____ 260—256.4

ALEX MAZEL, Primary Examiner

R. J. GALLAGHER, Assistant Examiner

U.S. Cl. X.R.

200—247.1, 247.2, 247.5, 256.4, 256.5; 424—200, 229, 232, 248, 251